United States Patent
MacNeal et al.

(10) Patent No.: US 6,955,194 B2
(45) Date of Patent: Oct. 18, 2005

(54) PROTECTED INTEGRAL CYLINDER VALVE, GAS PRESSURE REGULATOR AND FLOW METER, AND METHOD FOR REFILLING A GAS CYLINDER SO EQUIPPED

(75) Inventors: James R. MacNeal, Burton, OH (US); Gary S. Garber, Portland, ME (US); Barry A. Schwartz, Alexandria, VA (US)

(73) Assignee: Linde Aktiengesellschaft, Wiesbaden (DE)

(*) Notice: Subject to any disclaimer, the term of this patent is extended or adjusted under 35 U.S.C. 154(b) by 7 days.

(21) Appl. No.: 10/793,616

(22) Filed: Mar. 4, 2004

(65) Prior Publication Data

US 2004/0221919 A1 Nov. 11, 2004

Related U.S. Application Data (60) Provisional application No. 60/452,376, filed on Mar. 6, 2003.

(51) Int. Cl.[7] .............................................. B65B 31/00
(52) U.S. Cl. ............................. 141/4; 141/18; 141/348; 141/383
(58) Field of Search ............................. 141/2–6, 14–16, 141/18, 20, 346–352, 383, 384–386; 137/493, 509, 493.9; 251/149.9, 151

(56) References Cited

U.S. PATENT DOCUMENTS

| | | | | |
|---|---|---|---|---|
| 5,063,976 A | * | 11/1991 | Oi et al. ..................... | 141/18 |
| 5,520,214 A | * | 5/1996 | Mack et al. ............. | 137/505.34 |
| 6,047,743 A | * | 4/2000 | Byrd ........................ | 141/18 |
| 6,435,227 B1 | * | 8/2002 | Heinle ...................... | 141/63 |

* cited by examiner

Primary Examiner—Timothy L. Maust
(74) Attorney, Agent, or Firm—Pearne & Gordon LLP (57) ABSTRACT

A device for pressurized contents and an associated method. The device includes a container and a port assembly. In one aspect, the port assembly includes a body, a plunger, a seal arrangement, a plunger bias device, and a bushing. The plunger is movable and has a conduit for contents flow. The bushing moves the plunger, against the bias device, from the first plunger to a second plunger position to open the seal arrangement during movement of the bushing to permit contents flow. In another aspect, the device is transportable, and a valve assembly flow controller includes a valve, a regulator, and a flow meter. The device includes a protective housing, coupled to the container, enshrouding the flow controller to protect the flow controller from impact and transmit impact forces to the container. The housing is configured to permit access to the flow controller and inspection of the container and port connection to verify leak tightness with the housing coupled to the container.

24 Claims, 7 Drawing Sheets

PROTECTED INTEGRAL CYLINDER VALVE, GAS PRESSURE REGULATOR AND FLOW METER, AND METHOD FOR REFILLING A GAS CYLINDER SO EQUIPPED

RELATED APPLICATION

Benefit of priority of Provisional Patent Application Ser. No. 60/452,376 filed Mar. 6, 2003 is claimed and the disclosure is incorporated herein by reference.

FIELD OF THE INVENTION

The present invention is directed in general to containment of a gas, and more particularly to a refillable gas containment and delivery system having a controller for gas flow into and out of a cylinder. The fluid flow controller has novel aspects and/or is protected by a protective housing that at least partially shrouds the fluid flow controller.

BACKGROUND OF THE INVENTION

Cylinders containing a compressed gas can be found in environments such as manufacturing, research, production or synthesis facilities, hospitals, labs, classrooms, or any environment where a source of the desired gas is not otherwise available. The cylinders have a wide range of sizes and shapes, and are adapted to hold a particular type of gas. Most cylinders are a generally upright container having a flat bottom to allow the cylinder to rest vertically on a level surface. At the top of the cylinder is a port through which the compressed gas leaves the cylinder, typically through a valve installed on the cylinder by the gas supplier, and then through a regulator and/or flow meter installed by the end user and adapted to control the flow of gas from within the cylinder to the application point. Such cylinders are commonly employed to transport calibration gases, for example, to calibrate instruments, air monitors and safety systems at remote locations.

Gas cylinders are transported to an end user by a supplier at a time when the end user desires the gas. There are two types of gas cylinders used for portable and other calibration purposes. A type 1 cylinder is a refillable cylinder, which generally, but not always, provides protection to the valve by means of a metal cylinder cap. Refilling certain type 1 cylinders is typically accomplished through a fill port that must be engaged by a compatible fitting projecting from a supply line. During refilling, the fittings allow gas to flow from an external source through the cylinder valve into the cylinder. These fittings are commonly found on refilling devices that adhere to standardized thread designs that are available to end users to potentially enable the end users to attempt refilling of the cylinders when desired, possibly with an inappropriate gas. Many type 1 cylinders and type 2 cylinders, discussed below, do not have any means at all to prevent unauthorized refill of the cylinders.

A type 2 cylinder is the so-called "disposable" cylinder that generally provides no valve protection, as there is generally no metal cap with a type 2 cylinder. The metal cap, as found in some type 1 cylinders, is designed to protect the cylinder valve from contact with, and damage from, foreign bodies, encountered in a fall, drop or other impact of the cylinder valve during such an accidental event. Typically, gas is delivered to the end user in suitable quantities to satisfy the end user's needs for a period of time. Several gas cylinders are usually stored at the end user's location at any given time to ensure the availability of the gas when it is needed. As the contents of the cylinders are consumed, the pressure gradient between the interior of the cylinder and the ambient environment is no longer large enough to allow a user to withdraw gas from within the cylinder. At such a time, the cylinder's contents become consumed, and the cylinders are returned to storage at the end user's location to await final disposition. A substantial number of end users simply throw away disposable cylinders when the contained gas has been consumed, whether or not the cylinders are properly processed for disposal according to Federal, State and local regulations.

A technician must install the flow meter along with the regulator, which are not typically supplied integral to the cylinder valve by the supplier of the gas cylinders. Thus, a supply of properly functioning regulators and flow meters of varying pressure reducing and flow regulating characteristics must be maintained by the technician, or the technician's employer, to ensure proper delivery of the gas from the cylinder.

After installing the regulator, a technician calibrating an instrument, for example, will supply a quantity of gas having a known concentration, or another known property, from within the cylinder to the instrument, and the response of the instrument monitored. The response of the instrument is observed and compared to the concentrations of gas(es) within the cylinder as listed on the cylinder label. Automatic or manual adjustment of the instrument is made so that these values agree. Great care must be exercised on the part of the technician to prevent the exposed valve, flow meter and regulator from impacting a foreign object. A sufficiently strong impact may shear any of the valve, flow meter or regulator from atop the cylinder, causing a sudden release of the cylinder's contents. Pressurized cylinders having the valve, flow meter or regulator sheared off during a fall or otherwise striking a foreign body, have been known to become dangerous due to the sudden thrust from the pressure release. In such cases, the cylinder can become a projectile.

In type 2, or disposable cylinders, once the cylinders' contents have been consumed, the cylinders are to be properly recycled or discarded. Due to the sometimes potential and actual hazardous nature of the cylinders' contents, recycling the cylinders is problematic, and can cost from hundreds of dollars to thousands of dollars for each cylinder. End users operating on a limited budget may often stockpile many cylinders until an alternative use, or a cheaper avenue of disposal arises. The stockpile of consumed cylinders is often neglected and exposed to the elements, which causes the cylinders to degrade over time. As the cylinders degrade, cracks or leaks may develop and allow residual traces of gas to escape the cylinder into the surrounding environment. Further, consumed cylinders may tip or otherwise be knocked over, once again breaching the integrity of the cylinders, possibly allowing residual traces of gas to escape, as well as producing the projectile effect aforementioned.

To maximize portability, and minimize weight, the type 2 or so-called disposable cylinders have been developed to be discarded upon consumption. These are commonly used to provide a one time supply of gas to an end user who has few alternatives for a portable gas supply other than gas contained within a disposable cylinder. The disposable cylinders are frequently discarded as solid waste when they are consumed. Once again, though, due to the often hazardous nature of the cylinders' contents, facilities that accept consumed cylinders typically charge large disposal fees. Further, discarding the disposable cylinders contributes to the growing accumulation of solid waste at disposal sites. As a result, there is frequent confusion on the part of end users as to how to properly dispose of or recycle "disposable" cylinders when the contents have been fully or partially consumed.

Alternative uses for compressed gas cylinders developed by the end user are often beyond the intended use of the cylinders when they were originally designed. Attempts by the end user to refill a cylinder may subject the cylinder to unsafe high pressures or to hazardous materials for which the cylinder was not designed. A corrosive gas stored in a cylinder designed for an inert gas, for instance, can degrade seals or gaskets of the cylinder and allow the improperly stored gas to escape to the atmosphere. Such a release can cause irreparable damage to the environment, and can be hazardous if inhaled. Refilling of disposable cylinders is prohibited by the United States Department of Transportation and there are heavy fines for offenders as well as potential jail sentences.

SUMMARY OF THE INVENTION

It would be beneficial to provide a low-cost flow controller for a compressed gas cylinder, the flow controller being protected by a housing that will minimize damage to the flow controller due to impacts on the housing. The flow controller should be accessible with the housing in place, and should include a valve to open and close the port, thereby turning the supply of gas from the cylinder on and off, and a regulator and flow meter to vary the flow rate of gas from the cylinder, the varying flow rate being displayed by a visual indicator. Further, there is a need for the valve, flow meter and regulator combination to be provided with a filling port that is accessible with the housing in place to allow the cylinder to be refilled by an appropriate party while inhibiting the ability of others to refill the cylinder with a possibly inappropriate material. Refilling cylinders capable of such a refill is prohibited by anyone other than the cylinder's owner or officially designated refiner per United States Department of Transportation regulations. The housing should be coupled to the flow controller by an impact energy absorbing deformable shield having observation ports to allow inspection and verification of leak tightness of the connection of the flow controller with the cylinder. To make the flow controller and cylinder combination portable, the housing should also include a handle specifically designed to permit a safe and comfortable grip for hand carrying and a feature to which a carrying strap can be attached. Many technicians carry type 1 and 2 cylinders with the regulator attached. This increases the danger of valve shear if dropped due to the longer valve regulator dimension which serves to increase the torque experienced by the cylinder and valve interface during impacts. Thus the handle and carrying strap comprise an important improvement in safety.

In accordance with one aspect, the present invention provides a device for pressurized contents. The device includes a container that has a hollow interior for location of the contents therein. The device includes a port assembly for selective conveyance of contents between an exterior of the container and the container interior. The port assembly includes a body that has a hollow passageway that extends from the container exterior toward the container interior. A plunger of the port assembly is movable within the passageway of the body. The plunger has a conduit through which the contents may flow. The port assembly includes a seal arrangement between the plunger and the body to prevent conveyance of the contents though the conduit of the plunger at a first plunger position and permit conveyance of the contents though the conduit of the plunger at a second plunger position. A plunger bias device of the port assembly biases the plunger into the first plunger position. The port assembly includes a movable bushing within the passageway and located between the movable plunger and the container exterior. The bushing includes a conduit through which the contents may flow. The bushing moves the plunger from the first plunger to the second plunger position during movement of the bushing from a first bushing position to a second bushing position.

In accordance with another aspect, the present invention provides a portable device for holding pressurized contents. The device includes a transportable container having a hollow interior for location of the contents therein. The device includes a flow controller that is operatively connected to the container and being transportable therewith. The flow controller includes a valve for selectively permitting passage of contents, a regulator for controlling rate of flow of the contents, and a variable, selectable flow meter for monitoring the rate of flow. The device includes a protective housing, coupled to the container and transportable therewith, enshrouding the operatively connected flow controller to protect the flow controller from impact and absorb and transmit impact forces to the container, reducing the possibility of valve shearing. The protective housing is configured to permit access to and operation of the flow controller with the protective housing coupled to the container.

In accordance with another aspect, the present invention provides a method for providing pressurized contents to a container device. The method includes providing the device that has a container with a hollow interior for location of the contents therein, and a port assembly for selective conveyance of contents between an exterior of the container and the container interior. A supply line is brought into operative engagement with the port assembly. This step includes engaging the supply line to a body of the port assembly that has a hollow passageway that extends from the container exterior toward the container interior, engaging the supply line against a movable bushing, which is located within the passageway and which has a conduit through which the contents may flow, to move the bushing from a first bushing position to a second bushing position, moving a movable plunger, located within the passageway of the body and having a conduit through which the contents may flow, via movement of the bushing such that the plunger moves from a first plunger position to a second plunger position against the bias of a plunger bias device, and opening a seal arrangement, which is located between the plunger and the body, as the plunger moves from the first plunger position to the second plunger position, to permit conveyance of the contents though the conduit of the plunger.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION OF EXAMPLE EMBODIMENTS

Certain terminology is used herein for convenience only and is not to be taken as a limitation on the present invention. Further, in the drawings, the same reference numerals are employed for designating the same elements throughout the figures and certain features may be shown in somewhat schematic form.

FIGS. 1–4 show an example of a device 10 in accordance with one aspect of the present invention. Within the shown example device 10, a unitary flow controller 12, of an overall valve assembly 16, and a protective housing 14 are installed on a container 18 for holding pressurized contents. It is to be appreciated that the contents may be liquid and/or gas, or some other pressurized contents, and it is to be appreciated that the contents may have any of numerous chemical compositions. In one specific example, the contents may be a portable calibration gas. Although the contents may be varied, for ease of reference, the contents are referred to herein as gas.

Also, although it is to be appreciated that the container 18 may have any of several shapes, configurations, etc., the container will typically be a cylinder. As such, the container 18 is referred to herein as the cylinder 18, with the understanding that the present invention is applicable to different containers. The cylinder 18 is to be manufactured from a material having properties suitable to withstand the pressures that the cylinder will be subjected to, the environment the cylinder will be used in, and will not be detrimentally affected by the gases to be contained within the cylinder.

Within the shown example, a connector 20, upon which the flow controller 12 is mounted, is mated with an opening port 22 (FIG. 7) of the cylinder 18. As should be appreciated, the connector 20 and the port 22 include compatible features such as threaded portions, for example, that engage each other to form a connection 24 between the connector and the cylinder. The connection 24 (i.e., joining of the connector 20 to the port 22 of the cylinder) is assembled, by an authorized party, such as the supplier of the gas. Although it is possible to remove the connector 20 from the cylinder 18, such removal (i.e., breaking of the connection 24) should only be done by the authorized party.

Figure 1:
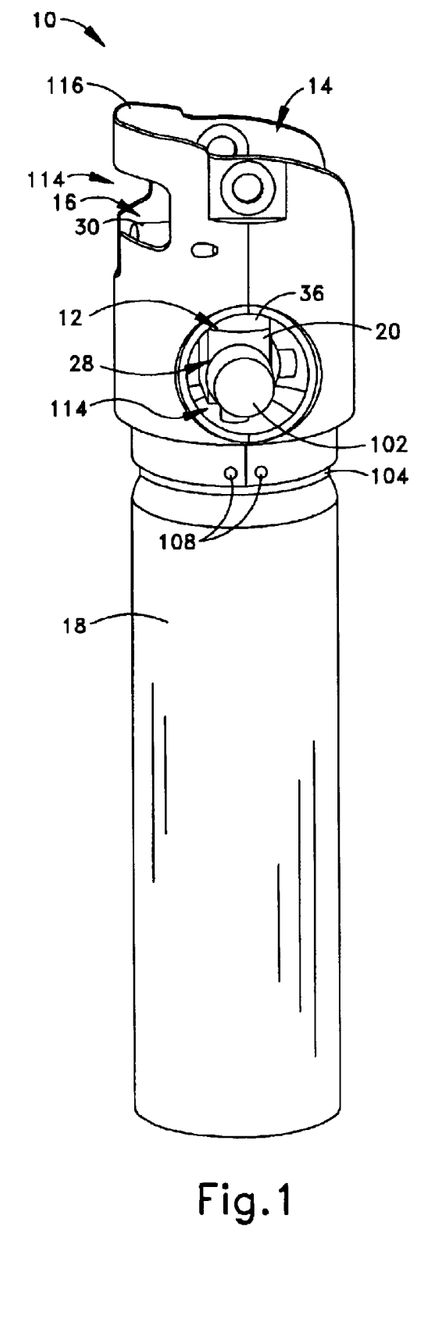
FIG. 1 is a first side view of an example device for holding pressurized contents, and which includes a container for the contents, a unitary flow controller, and a protective housing in accordance with one aspect of the present invention.
Figure 2:
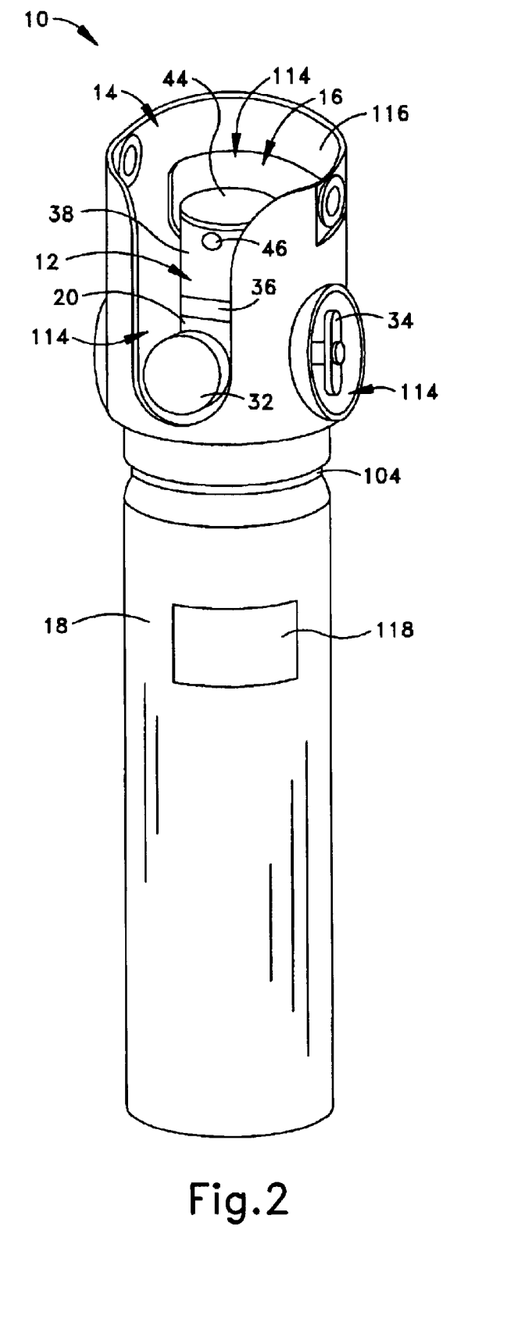
FIG. 2 is a second side view of the example device of FIG. 1.
Figure 3:
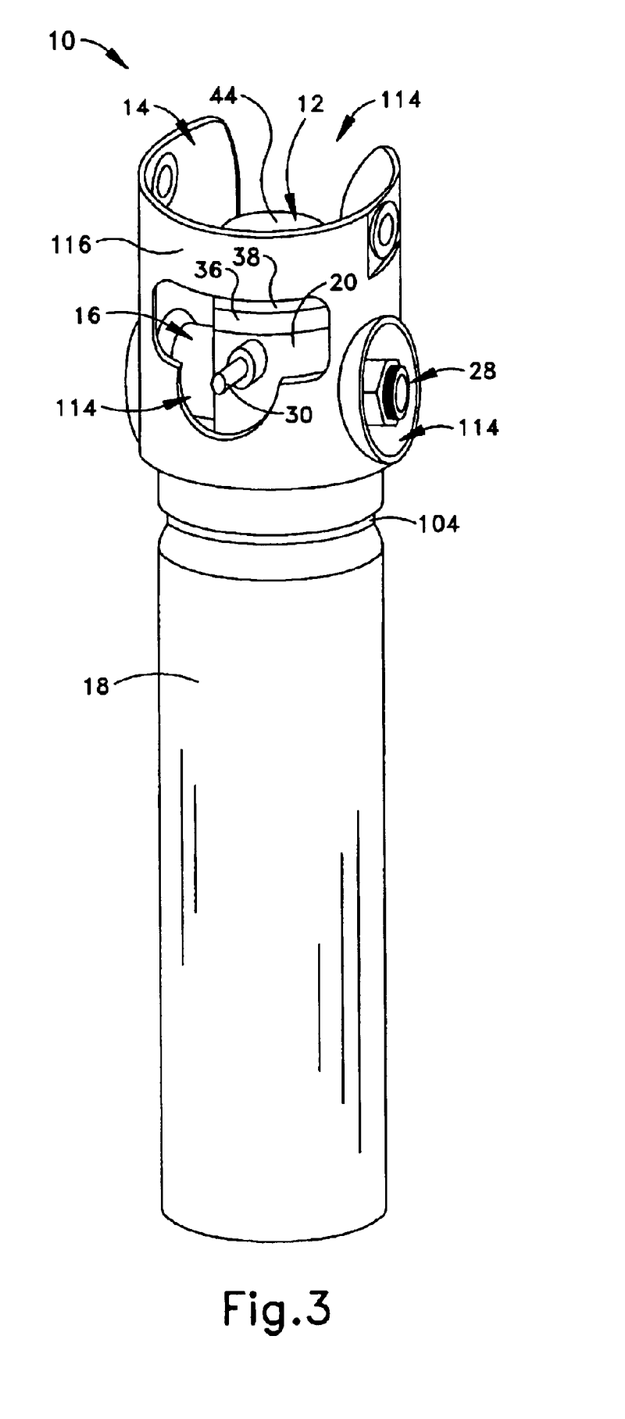
FIG. 3 is a third side view of the example device of FIG. 1.
Figure 4:
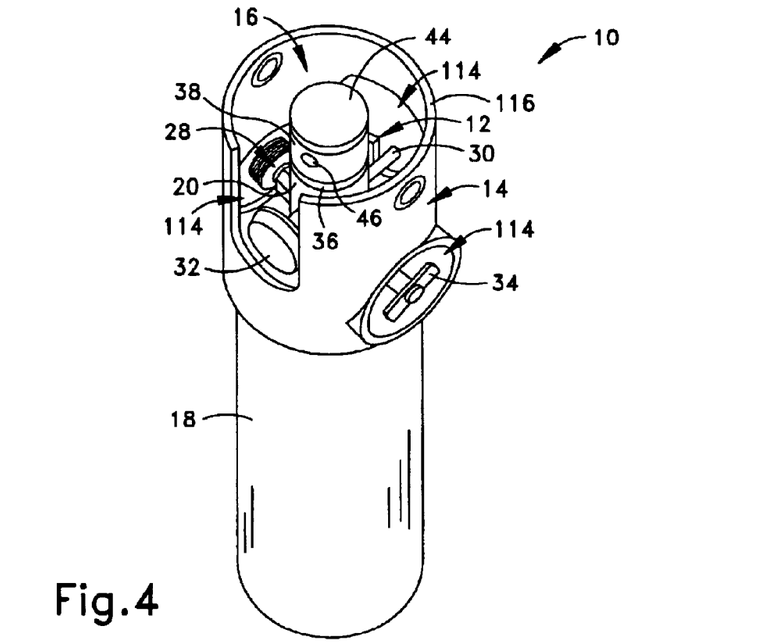
FIG. 4 is downward-looking perspective view of the example device of FIG. 1.

FIGS. 1–3 show three different sides of the example device 10, and FIG. 4 shows the top of the device. Each of these views show some, but not all, of the structure of the flow controller 12, which has a unique and novel construction and configuration itself in accordance with one aspect of the present invention, and other structures, which may have unique and novel constructions and configurations in accordance with another aspect of the present invention, located on the connector 20. The inability to see all of the structures within any one of the FIGS. 1–4 is partially due to the presence of the protective housing 14.

Figure 5:
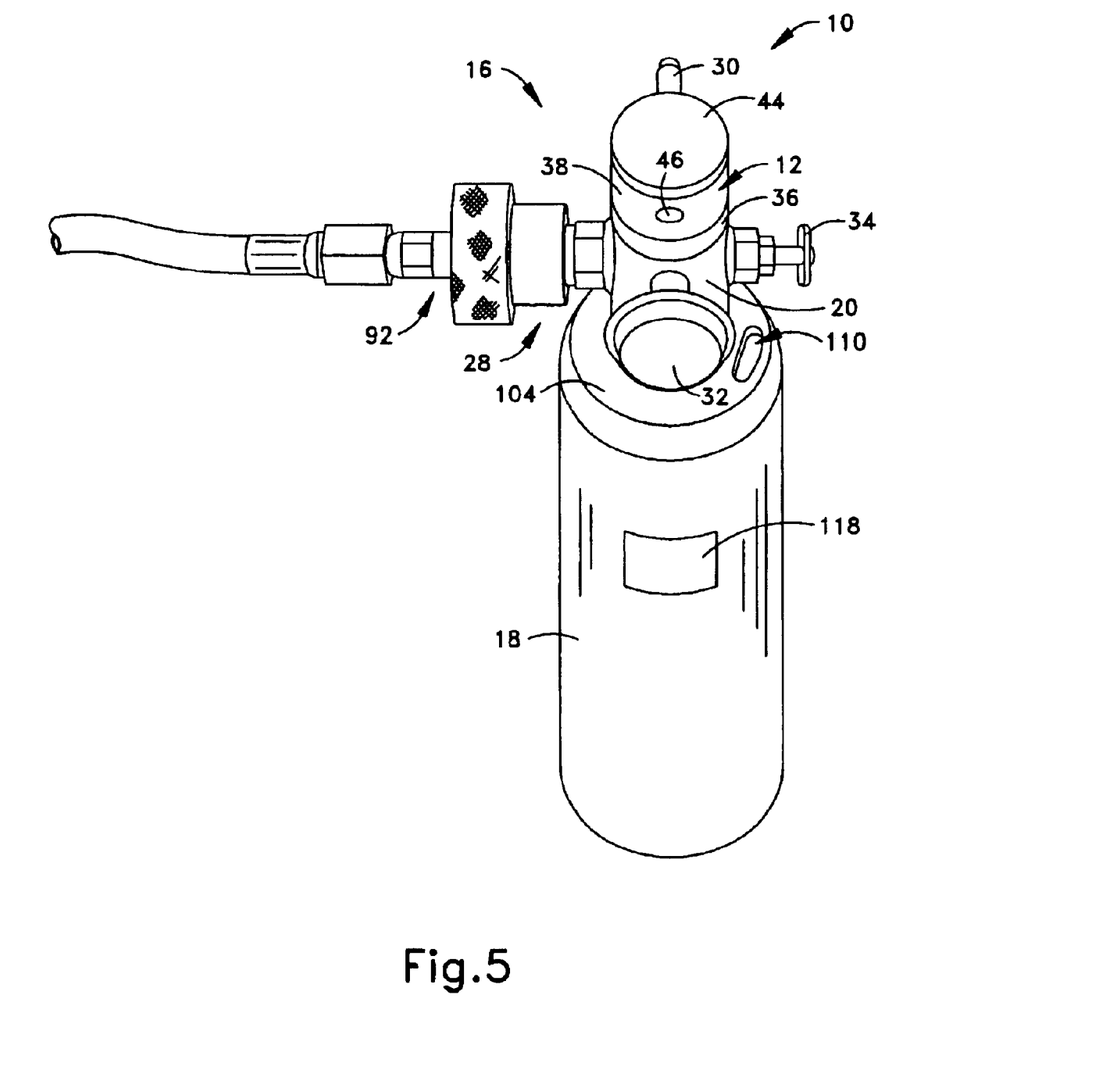
FIG. 5 is downward-looking perspective view of a device that has unitary flow controller, either as a partially assembled state of the device of FIG. 1 or as an example device itself, in accordance with another aspect of the present invention, and shows a supply line coupled to a fill port of the unitary flow controller.

The protective housing 14 in conjunction with the flow controller 12 is in accordance with another aspect of the present invention. However, in order to appreciate the above-mentioned aspects of the present invention, it would be prudent to first appreciate the structures (e.g., the flow controller 12) on the connector 20. In general, the other structures with the flow controller 12 on the connector 20 may include a fill port 28, a nozzle 30, and a gauge 32 (FIG. 5). The fill port 28 is for receipt of gas, and the nozzle 30 is for dispensing of gas. The gauge 32 is for displaying a gas property such as flow rate, quantity, or pressure of the gas in the cylinder 18 or at some point within the flow controller 12.

Figure 6:
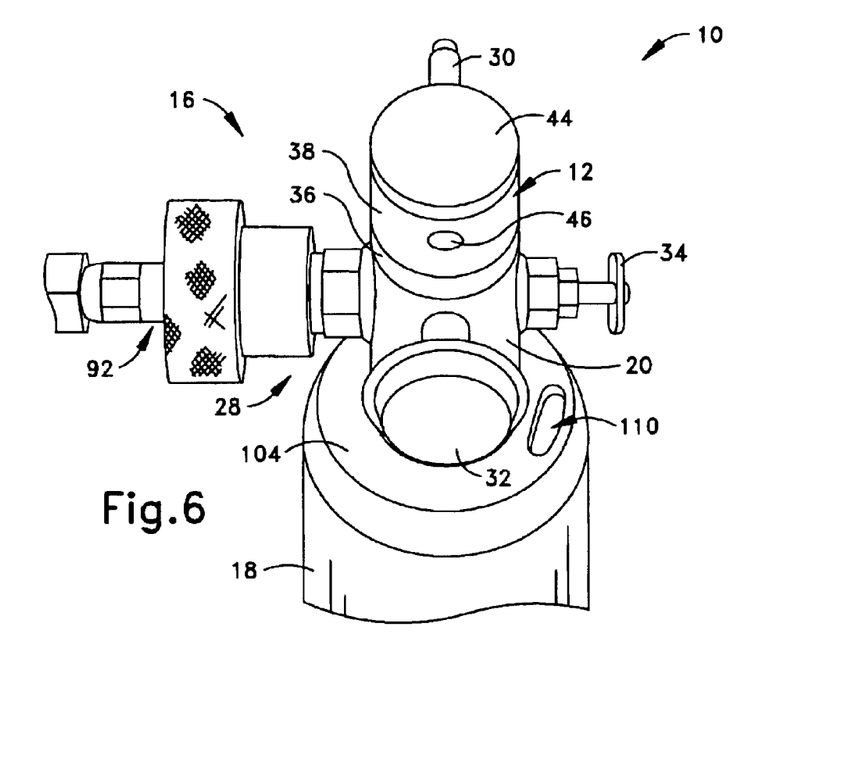
FIG. 6 is an enlarged side view of a portion of the device of FIG. 5 and the supply line.

Turning to details of the flow controller 12, the controller includes a main valve 34 for controlling flow of the contents, a regulator 36 for controlling pressure of flow of the contents, and a flow meter 38 for monitoring and controlling the rate of flow of the contents. The main valve 34, the regulator 36, and the flow meter 38 together control the release of gas from the cylinder 18. In pertinent part, it is to be appreciated that the main valve 34, the regulator 36, and the flow meter 38 are integrally formed as a single unit within the device 10. As such, in accordance with one aspect of the present invention, the device 10 is utilized without the need to connect to a separate, non-integral regulator and/or flow meter. FIGS. 5 and 6 are illustrations of the flow controller 12 installed on the cylinder 18 without the protective housing 14. FIGS. 5 and 6 may be taken as an embodiment of one aspect (i.e., integration of the flow controller 12) of the invention or make be taken as a partially assembled embodiment of another aspect (i.e., the flow controller 12 in conjunction with the protective housing 14) of the present invention.

The main valve 34 of the flow controller 12 is operable between two settings, which are "off" and "on." The main valve 34 is adapted to prevent gas flow (in and out) when in the off position and to permit gas flow when in the on position. As gas proceeds from the cylinder 18, the gas passes through the main valve 34 and then proceeds toward the regulator 36. Also, located downstream (as gas flows from the cylinder 18) are the flow meter 38 and the gauge 32. Finally, the nozzle 30 is operatively connected for the gas flow proceeding from the flow controller 12.

The location of the main valve 34 upstream from the regulator 36, the flow meter 38, and the gauge 32 prevents the regulator, the flow meter, and the gauge from being exposed to pressurized gas from within the cylinder 18 when the main valve is in the off position. Thus, during extended periods of non-use of the assembled device 10, the main valve 34 can be turned to the off position and the flow meter 38 temporarily adjusted to one of the predetermined flow rate settings to prevent the regulator 36 from being exposed to the pressure exerted by the gas. This ability to depressurize the regulator 36 maximizes the life and performance of the regulator.

The flow meter 38 includes a controller 44 (FIG. 6) to allow a technician to adjust the flow rate of gas leaving through the nozzle 30 at a pressure set by the regulator 36. Predetermined flow rate settings are selected by manipulating the controller 44 to provide the desired flow rate of gas through the nozzle 30. The currently-selected setting is displayed via a display portion 46 provided on the flow controller 12. As such, a controlled release of gas (not shown) from the cylinder 18 is provided at the nozzle 30 when desired.

It is to be appreciated that the main valve 34, the regulator 36, and the flow meter 38 may have any of several specific constructions and configurations. All possible constructions and configurations of the main valve 34, the regulator 36, and the flow meter 38 are intended to be within the scope of the present invention. Also, it is to be appreciated that nozzle 30 and the gauge 32 each may have any of several specific constructions and configurations. For example, the nozzle 30 may be specific for a particular use. All possible constructions and configurations of the nozzle 30 are intended to be within the scope of the present invention.

Turning to the fill port 28 (FIG. 7), it is to be appreciated that the fill port itself is another aspect of the present invention. The fill port 28 is an assembly for selective conveyance of contents between an exterior of the cylinder 18 and an interior of the cylinder. By the phrase exterior of the cylinder it is meant anything outside of the pressurized interior of the cylinder, such as a supply source for delivering gas, a receiving device to which gas is supplied from the cylinder, or even the ambient atmosphere. Generally, the fill port 28 is for flow of gas contents into the cylinder 18. However, it is to be appreciated that the novel construction of the fill port 28 could be utilized for an outflow from the cylinder 18.

In one example (FIG. 7) that is in accord with one aspect of the present invention, the assembly of the fill port 28 includes a body 52 having a hollow passageway 54 that extends from the cylinder exterior toward the cylinder interior. The body 52 is attached onto the connector 20 via a threaded interconnection or other suitable connection for securing the body in a sealing manner. A passage (not shown) extends through the connector 20, and possibly other components of the flow controller 12, between the body 52 and the cylinder interior.

Figure 7:
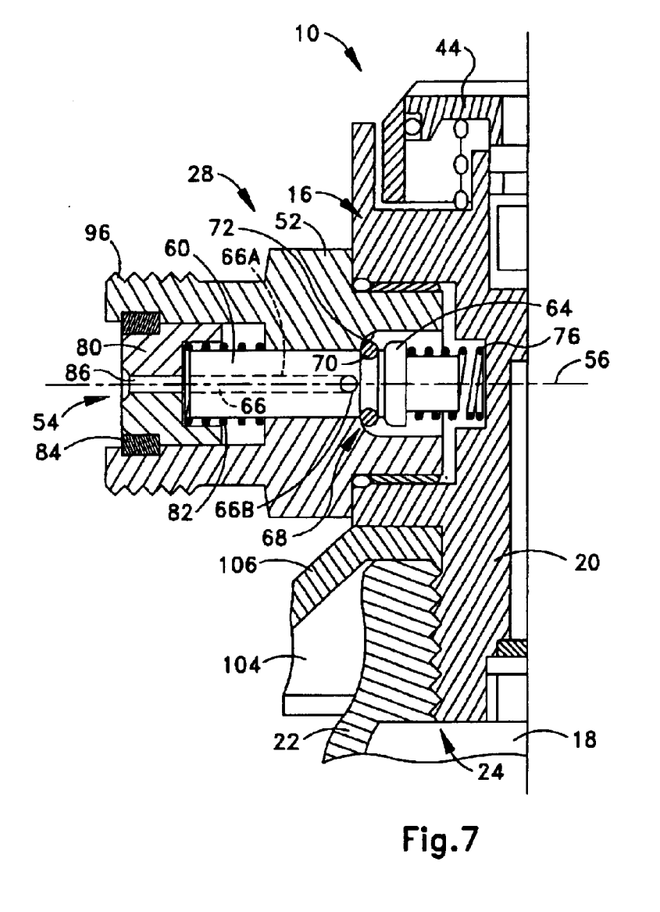
FIG. 7 is a cross-sectional, partial view of an example device, which may be a portion if either of the devices of FIG. 1 or 5, or which is an example itself that is in accordance another aspect of the present invention, and shows details of a fill port of a flow controller and a shield associated with a protective housing (not shown)

As will be appreciated upon viewing the example of FIG. 7, the passageway 54 of the body 52 includes several, varying size portions that are aligned along an axis 56 that extends along the passageway. In the shown example, the portions are generally cylindrical. It is to be appreciated that the passageway 54 may be otherwise constructed or configured.

A movable plunger 60 is located within the passageway 54 of the body 52. The plunger 60 has a first portion that is shaped congruently with a portion of the body 52. The plunger 60 is engaged with the body 52 at this location, and is able to slidingly move relative to the body. The plunger 60 also has an annular seal recess, and an annular spring collar 64 located adjacent to the seal recess. A conduit 66 extends through the plunger 60. In the specific example, the conduit 66 includes an axial bore 66A that extends from an end face of the plunger 60 that is closest to the exterior end (left most end, as viewed in the FIG. 7) of the body 52. The conduit 66 also includes a bore 66B that extends radially out from the axial bore and terminates adjacent to the seal recess. It is to be appreciated that the conduit 66 may be different, and may even be on the exterior of the plunger 60. As can be appreciated, gas (i.e., contents for the cylinder) can flow through the conduit 66.

A seal arrangement 68 between the plunger 60 and the body 52 prevents conveyance of gas though the conduit of the plunger at a first plunger position and permits conveyance of gas though the conduit of the plunger at a second plunger position. Within the shown example, the seal arrangement 68 includes a sealing ring 70 located in the seal recess of the plunger 60, and a tapered conical seat 72 on the body 52. When the plunger 60 is located in the first plunger position (to the left, as viewed in FIG. 7), the sealing ring 70 is engaged against the seat 72.

A plunger bias device 76 biases the plunger 60 into the first plunger position. In the shown example, the plunger bias device 76 is a coil spring 76 that is aligned on the axis 56 and that encircles a portion of the plunger 60. The spring 76 extends from the spring collar 64 to a surface of connector 20 to urge the plunger 60 outward into the first position. When the plunger 60 is biased by the spring 76 into the first position, the seal arrangement 68 prevents gas from escaping through the fill port 28. It is to be noted that the shown example includes a recess on the connector 20, within which the spring 76 is seated and into which the inward end of the plunger 60 may extend when the plunger is in the second position. It is to be appreciated that a different construction or configuration may be used to obviate the need for the recess.

A movable bushing 80 is located within the passageway 54 of the body 52 and is located between the movable plunger 60 and the container exterior. In particular, the bushing 80 has a first position (leftmost location as viewed in FIG. 7), in which the bushing is located adjacent to an outermost extent of the passageway 54. In a second bushing position, the bushing 80 is located further into the body 52. The bushing 80 is slidable along the axis 56 within the passageway 54 between the first and second bushing positions. At the first position, the bushing 80 helps block the passageway. Accordingly, the bushing 80 helps prevent entry of debris and other unwanted matter is from entering the passageway 54. Also, the presence of the bushing 80 provides a level of protection to the plunger 60 and other structure of the fill port 28.

The movement of the bushing 80 from the first bushing position to the second bushing position moves the plunger 60 from the first plunger position to the second plunger position. It is to be noted that the shown example provides for a gap between the bushing 80 and the plunger 60 when the bushing is in the first bushing position. As such, the bushing 80 travels the distance of the gap before engaging and moving the plunger 60. Such a gap between the bushing 80 and the plunger 60, results in a required threshold amount of movement before plunger engagement occurs and may provide for additional protection of the plunger.

A bushing bias device 82 biases the bushing 80 into the first bushing position. In the shown example, the bushing bias device 82 is a coil spring 82 that is aligned on the axis 56 and that encircles a portion of the plunger 60. The spring 82 extends from an inner end of the bushing 80 to a surface of body 52 to urge the bushing outward into the first position. When the bushing 80 is biased by the spring 82 into the first position, the bushing helps to prevent debris entry and provides protection as mentioned above.

It is to be noted that the bushing 80 may have any of a variety of shapes, constructions, and configurations. In general, the bushing 80 has an annular shape that is congruent with the outer end of the passageway 54 through the body 52. As one example of particular structure, the shown bushing 80 has a portion into which a portion (i.e., an outward end) of the plunger 60 may be located. The result is a nesting effect that helps align the plunger 60, the bushing 80, and the spring 82. Also, the bushing 80 and/or the body 52 may include some structure to retain the bushing within the passageway 54. For example, the bushing 80 may include an annular shoulder. Additional structure, such as a sealing ring 84 and associated structure on the body 50 and/or the bushing 80 may also be provided. Still further, it is to be noted that the shown example provides for the bushing 80 being located entirely with the passageway 54. It is contemplated that the bushing 80 may extend out of the passageway 54.

The bushing 80 includes structure 86 to permit gas flow past the bushing. Although such structure 86 may have a variety of configurations and constructions (e.g., an external groove), the shown example includes an axial bore 86 that is aligned with the bore portion of the conduit 66 of the plunger 60. In fact, when the bushing 80 is in engagement with the plunger 60, the aligned bores provide a very direct route for gas flow.

In order to fill (or refill) the device 10 with gas (e.g., gas, liquid, liquified gas, etc.), a supply is connected to the fill port 28. Typically, such filling is accomplished via connection of a supply line 92 (FIG. 8) to the fill port 28. It is to be appreciated that the fill port 28 can provide an additional level of protection in that a congruently configured supply line 92 is required to perform the filling procedure. The supply line 92 extends from an external source (not shown)

Figure 8:
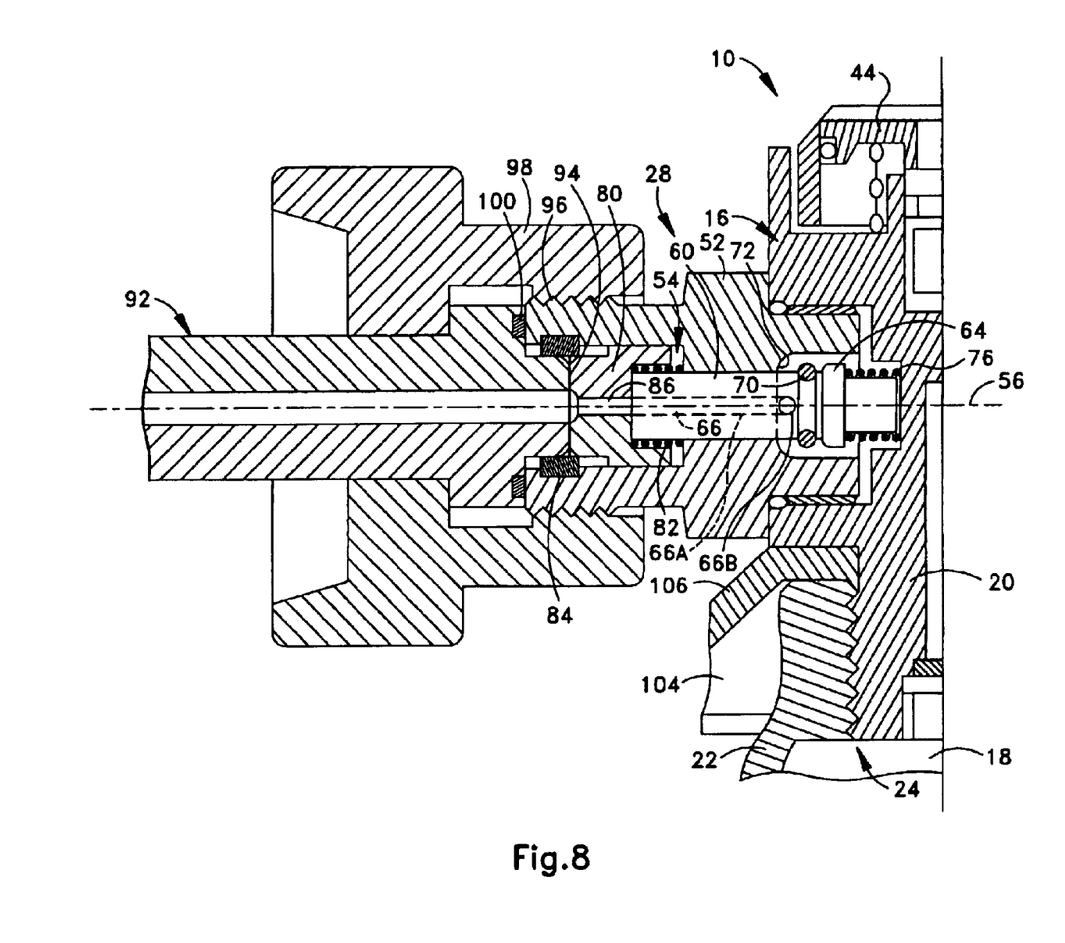
FIG. 8 is view similar to FIG. 7, but with the supply line connected to the fill port of the flow controller.

FIG. 8 shows an example of such an end portion of the supply line 92. During filling, a leading end 94 of the supply line 92 contacts the bushing 80 to slide the bushing, and subsequently the plunger 60 inward toward the connector 20, thereby unseating sealing ring 70 and opening the conduit 66. As such, gas may flow from the supply line 92 through the passageway 54, in part, via the bore 86 and the conduit 66 toward the cylinder 18. A sealing ring 100 on the end of the supply line 92 provides a sealing effect between the supply line 92 and the body 52. Also, the sealing ring 84 within the body 52 provides a sealing effect to the supply line 92.

A connector 96 is disposed on the fill port 28. The connector 96 has a construction and configuration that cooperates with corollary structure of a coupler 98 on the supply line 92 to secure the supply line to the fill port 28. In one example the connector 96 has a male threaded portion that is engageable with a compatible female threaded portion within the coupler 98 when it is desired to fill the cylinder 18 with gas. The coupler 98 is rotatable about the axis 56 to tighten onto the connector 96. Upon completion of the refilling, the supply line 92 is removed from the fill port 28 (i.e.; the coupler 98 is removed from the connector 96) and the plunger 60 and the bushing 80 return to their biased positions by springs 76 and 82, respectively. When not being utilized, the fill port can be covered by a fill port cap 102, as shown in FIG. 1.

The fill port 28 in accordance with one aspect of the present invention includes features separate from those found on fill ports according to existing industry standards. The unique features interfere with the ability of unauthorized parties to refill the cylinder 18 who would be attempting to make the connection using an industry standard and therefore readily available fitting.

With an appreciation of the flow controller 12 and its novel aspects and the fill port 28 and its novel aspects, attention is now directed back to FIGS. 1–4. As can be seen, the example protective housing 14 enshrouds (e.g., encircles) the valve assembly 16 and particularly the flow controller 12. The protective housing 14 is intended to provide a level of protection and as such is formed from a generally rigid and durable material. Examples of such materials include plastic, rubber, and/or metal materials. However, it is contemplated that other protective materials could be used.

The protective housing 14 is coupled to the cylinder 18 so that the entire device 10 is readily transportable. As mentioned, the housing 14 protects the flow controller 12 from impact. Moreover, It is to be appreciated that the protective housing 14 is operatively connected to transfer impact force-toward the cylinder 18. This connection is in distinction from a connection of a protective housing to a valve assembly/flow controller, which could potentially transfer undesirable impact force to the valve assembly/flow controller. In one example of the connection of the protective housing 14 to the cylinder 18, a shield 104 (see FIGS. 5-8) is provided in accordance with one aspect of the present invention. As can be appreciated, the example shield 104 has an annular configuration and is shaped generally as a truncated cone. The shield 104 had a central aperture at an upper end 106, and the shield is seated against an upper end of the port 22 (i.e., at a stem that provides the port) of the cylinder 18 at the location of the central aperture of the shield.

Fasteners 108 couple the housing 14 to a lower portion of the shield 104 adjacent to a shoulder of the cylinder 18. In one example, several fasteners 108 are spaced around the periphery of the housing 14. In the event of force application to the housing 14, the housing transfers the force around the circumference of the lower portion of the shield 104. It is contemplated that impact force is transmitted from the protective housing 14 toward the cylinder via the shield 104. This is due to the interface between the shield 104 and the cylinder 18, rather than a force transmission path that includes the flow controller 12.

It is also contemplated that the shield 104 may function as an energy dissipating component. An impact that is sufficiently large and/or sudden could impart a sufficiently large force impulse transferred from the housing 14 that will cause deformation of the shield 104. This deformation prevents damage to other components of the device 10. This damage prevention can include damage prevention to the cylinder 18, the flow controller 12, or the connection there between. As such, when the flow controller 12 is installed on the cylinder 18, the shield 104 forms a so-called "crumple-zone" that will dissipate a portion of a force imparted to the housing 14 by deforming. In order to provide for such energy dissipation, the shield 104 is made of a material, dimensioned and configured accordingly, that will plastically yield. One example of such a material is aluminum.

It is to be noted that the presence of the shield 104 may limit visibility of some structure, and specifically the connection 24 between the connector 20 and the cylinder 18. In one example, at least one aperture 110 (FIGS. 5 and 6) is formed in the shield 104 to allow a person (e.g., a technician) to inspect the connection 24 between the connector 20 and the cylinder 18. Also, the one or more apertures 110 in the shield 104 may provide added ventilation at the location of the connection 24 between the connector 20 and the cylinder 18.

It is to be appreciated that, in accordance with one aspect of the present invention, the flow controller 12, etc. and the housing 14 are not intended to be removed during routine use (e.g., dispensing of contents, filling of contents, etc.). Openings 114 in the housing 14 provide access/viewing to the various components of the flow controller 12, etc. when assembled. As such, the configuration of the protective housing 14 is such that at least one opening 114 in the housing permits access/viewing of at least one of the fill port 28, the valve 34, the regulator 36, the flow meter 38, etc. In the shown example, all of these items are accessible/viewable.

Figure 9:
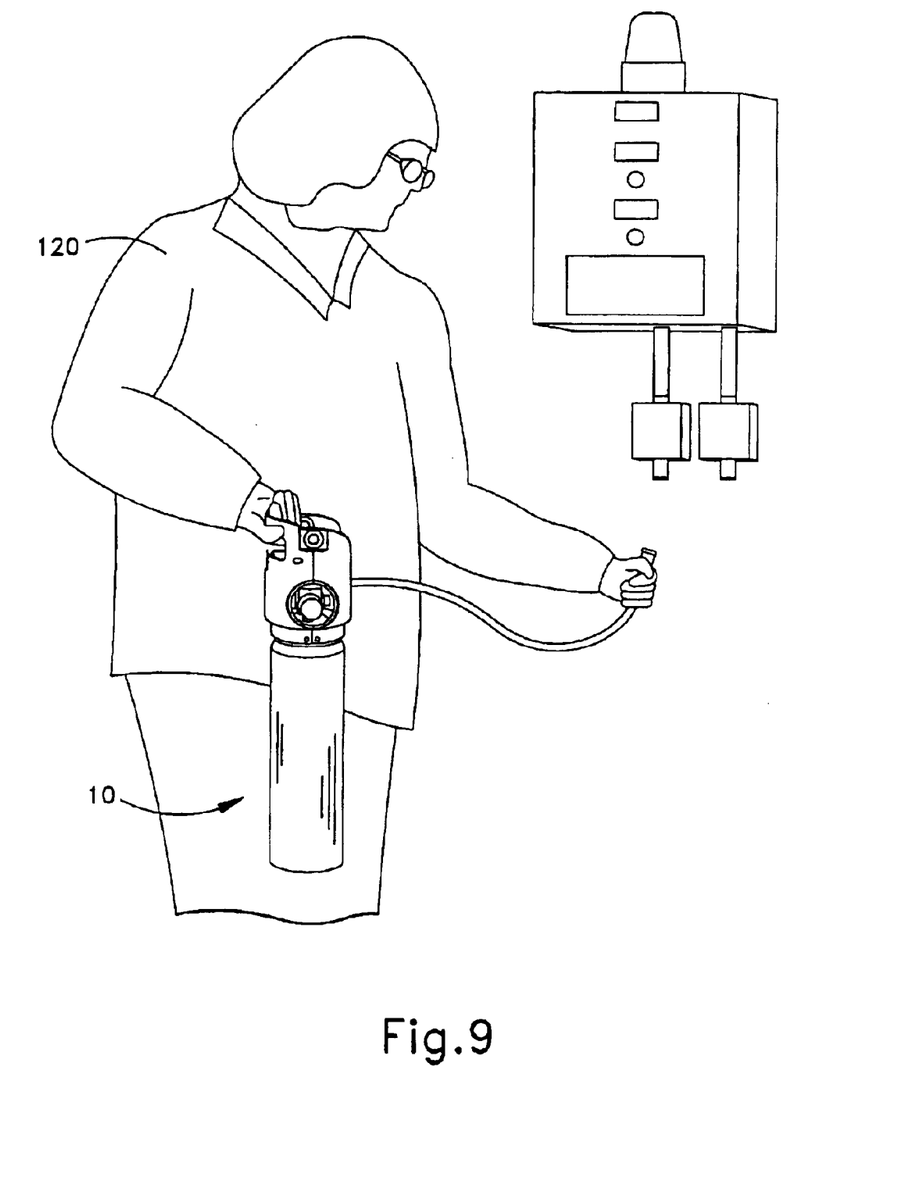
FIG. 9 is an illustrative view of a device in accordance with the present invention, which is being connected by a technician for delivery at the desired flow rate of gas to an instrument being calibrated in the field.

As yet another possible feature, the protective housing 14 may include a handle 116, connection points for a support strap, etc. Improved portability and safety may be provided by the provision of the handle 116, support strap, etc. Still further additional features may be incorporated to minimize the potential for harm to persons, such as a technician 120 (FIG. 9), located in proximity to the device 10. It is to be appreciated that FIG. 9 shows the use of the device 10 for the purpose of dispensing gas.

As an example of such additional features may include the nozzle 30 being oriented in a direction generally away from a location from which the technician 120 may view the setting of the regulator 36. In the event of an accidental discharge of gas, the gas will be directed away from the technician 120. Further, pressure relief devices (not shown) are provided to relieve over-pressure that may occur. For example, rupture disks (not shown) can be installed on the flow controller 12 to burst before a critical pressure is reached within the cylinder 18.

Additional features of the present invention may include visual indicia 118 located on the cylinder 18, flow controller 12, and/or housing 14. The visual indicia 118 can provide information regarding contents, handling instructions, safety information and/or possibly other information.

A method for filling a cylinder 18 provided with the flow controller 12 includes the steps of exposing the fill port 28 from beneath the fill port cap 102; connecting the supply line 92 to the fill port; depressurizing the regulator 36; opening the passage between the fill port and the cylinder; transmitting gas from the external source, through the supply line and into the cylinder 18; removing the supply line from the cylinder; and replacing the cap on the fill port.

To connect the supply line 92 to the fill port 28, the supply line engages the bushing 80 as shown in FIG. 8. According to one embodiment of the present invention, the supply line 92 is releasably connectable to the fill port 28 without the use of tools under normal operating circumstances. Allowing the connection of the supply line 92 to the fill port 28 according to this embodiment, repetitive motion injuries inflicted upon the technician performing the connection are minimized. This connection is accomplished simply by the application of easily achievable hand torques on the connecting features.

Before gas can be fed to the cylinder 18 through the supply line 92, the cylinder 18 must first be evacuated. The controller 44 is adjusted to an off position that prevents the flow of gas through the nozzle 30 while the main valve 34 remains in the on position. This configuration of the controller 44 and the main valve 34 prevents gas from escaping the cylinder 18 through the nozzle 30, but allows the gas to exert pressure on the gauge 32 and controllably pass through the fill port 28 when desired. With the supply line 92 coupled to the flow controller 12, residual gas within the cylinder 18 is vented to an appropriate location. After residual gas is vented, a vacuum is created in the supply line 92 to evacuate the cylinder 18 and lower the pressure therein. While generally maintaining the low pressure in the cylinder 18, the vacuum in the supply line 92 is discontinued and the supply line is connected to the external source of the gas that is to be fed into the cylinder 18.

With the main valve 34 open, the external source of gas is gradually turned on. Gas is supplied to the cylinder 18 through the supply line 92 and flow controller 12. The gas is fed into the cylinder 18 until a predetermined pressure is reached, the predetermined pressure falling within the allowable range of pressures for the particular cylinder 18 being filled. Once this pressure is reached, the main valve 34 is closed to retain the gas within the cylinder 18. Residual gas within the supply line 92 is vented to an appropriate location to relieve the pressure within the supply line, allowing the supply line to be removed. Gas trapped between the flow meter 38 and the closed main valve 34 is vented to an appropriate location by temporarily adjusting the controller 44 to one of the predetermined flow rate settings that allows gas to flow through the nozzle 30. The controller 44 is returned to the off position once the pressure exerted by the trapped gas has been relieved through the nozzle 30. The fill port cap 102 is then replaced over the fill port 28 to once again protect the fill port from its ambient environment and minimize unauthorized access to the fill port. This procedure can be repeated to refill the cylinder 18 with the gas as needed.

It is to be noted that all aspects of the cylinder 18, flow controller 12, supply line 92, external source of the gas, etc. should be inspected for the presence of obstructions or other issues that could possibly interfere with the filling process. Any discovered obstructions should be removed before proceeding with the rest of the filling process. Likewise, all features should be inspected for leaks throughout the filling process. These inspections should take place before, during and after the filling process to minimize the chances of an accidental release of the gas from within the cylinder 18.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed:

1. A device for pressurized contents, the device including:
   a container having a hollow interior for location of the contents therein; and
   a port assembly for selective conveyance of contents between an exterior of the container and the container interior, the port assembly including:
   a body having a hollow passageway that extends from the container exterior toward the container interior;
   a movable plunger within the passageway of the body, the plunger having a conduit through which the contents may flow;
   a seal arrangement between the plunger and the body to prevent conveyance of the contents though the conduit of the plunger at a first plunger position and permit conveyance of the contents though the conduit of the plunger at a second plunger position;
   a plunger bias device that biases the plunger into the first plunger position; and
   a movable bushing axially movable with respect to the entire body and at least partially positioned within the passageway of the body, the bushing located between the movable plunger and the container exterior, the bushing including a conduit through which the contents may flow, the bushing moving the plunger from the first plunger position to the second plunger position during axial movement of the bushing with respect to the body from a first bushing position to a second bushing position.

2. A device as set forth in claim 1, wherein the port assembly is a fill port assembly, the bushing being configured to be moved from the first bushing position to the second bushing position by connection of a contents-supplying component to the port assembly.

3. A device as set forth in claim 1, including a bushing bias device that biases the bushing into the first bushing position.

4. A device as set forth in claim 1, wherein the conduit of the plunger includes an opening though the plunger.

5. A device as set forth in claim 1, wherein the conduit of the bushing includes an opening through the bushing.

6. A device as set forth in claim 1, wherein the sealing arrangement includes a seal, mounted for movement with the plunger, which mates in sealing engagement with a seat surface on the body.

7. A device as set forth in claim 1, wherein the plunger engages and slides relative an interior wall of the body, the conduit of the plunger extends from an end portion of the plunger most proximate to the container exterior to a location adjacent to the sealing arrangement.

8. A device as set forth in claim 1, wherein the conduit of the plunger and the conduit of the bushing include portions aligned with each other.

9. A device as set forth in claim 1, including a sealing ring located adjacent to the bushing.

10. A device as set forth in claim 1, wherein the bushing is located within the passageway of the body.

11. A device as set forth in claim 1, wherein the bushing moves a distance toward the second bushing position before causing movement of the plunger toward the second plunger position.

12. A device as set forth in claim 1, wherein the plunger bias device includes an end portion located within the body.

13. A device as set forth in claim 1, wherein the bushing is adapted to engage the plunger to move the plunger from the first plunger position to the second plunger position.

14. A portable device for holding pressurized contents, the device including:
- a transportable container having a hollow interior for location of the contents therein;
- a flow controller, operatively connected to the container and being transportable therewith, including a valve for selectively permitting passage of contents, a regulator for controlling pressure of flow of the contents, and a flow meter for monitoring and controlling the rate of flow; and
- a protective housing, coupled to the container and transportable therewith, enshrouding the operatively connected flow controller to protect the flow controller from impact and transmit impact forces to the container, the protective housing being configured to permit access to and operation of the flow controller with the protective housing coupled to the container.

15. A device as set forth in claim 14, wherein the configuration of the protective housing includes at least one opening through which at least one of the valve, the regulator, and the flow meter is accessible or viewable.

16. A device as set forth in claim 14, wherein the flow controller includes a fill port, the protective housing being configured to permit access to and operation of the fill port with the protective housing coupled to the container.

17. A device as set forth in claim 14, wherein the protective housing includes a handle.

18. A device as set forth in claim 14, including a shield that provides the coupling between the protective housing and the container.

19. A device as set forth in claim 18, wherein the shield is configured to deform upon transmission of impact force from the protective housing.

20. A method for providing pressurized contents to a container device, the method including:
- providing the device that has a container with a hollow interior for location of the contents therein, and a port assembly for selective conveyance of contents between an exterior of the container and the container interior;
- bringing a supply line into operative engagement with the port assembly, including:
- engaging the supply line to a body of the port assembly that has a hollow passageway that extends from the container exterior toward the container interior,
- engaging the supply line against a movable bushing, which is at least partially positioned within the passageway and which has a conduit through which the contents may flow, to move the bushing with respect to the body from a first bushing position to a second bushing position,
- moving a movable plunger, located within the passageway of the body and having a conduit through which the contents may flow, via movement of the bushing such that the plunger moves from a first plunger position to a second plunger position against the bias of a plunger bias device, and
- opening a seal arrangement, which is located between the plunger and the body, as the plunger moves from the first plunger position to the second plunger position, to permit conveyance of the contents though the conduit of the plunger.

21. A method as set forth in claim 20, wherein the bushing moves a distance toward the second bushing position before causing movement of the plunger toward the second plunger position.

22. A method as set forth in claim 20, wherein the movement of the bushing from the first bushing position to the second bushing position is against the bias of a bias device.

23. A method as set forth in claim 20, wherein the plunger bias device includes an end portion located within the body.

24. A method for providing pressurized contents to a container device, the method including:
- providing the device that has a container with a hollow interior for location of the contents therein, and a port assembly for selective conveyance of contents between an exterior of the container and the container interior;
- bringing a supply line into operative engagement with the port assembly, including:
- engaging the supply line to a body of the port assembly that has a hollow passageway that extends from the container exterior toward the container interior,
- engaging the supply line against a movable bushing, which is located within the passageway and which has a conduit through which the contents may flow, to move the bushing from a first bushing position to a second bushing position.
- moving a movable plunger, located within the passageway of the body and having a conduit through which the contents may flow, via movement of the bushing such that the plunger moves from a first plunger position to a second plunger position against the bias of a plunger bias device, and
- opening a seal arrangement, which is located between the plunger and the body, as the plunger moves from the first plunger position to the second plunger position, to permit conveyance of the contents though the conduit of the plunger,
- wherein the movement of the bushing from the first bushing position to the second bushing position is against the bias of a bias device.

* * * * *